US006774812B2

(12) United States Patent
Tada

(10) Patent No.: US 6,774,812 B2

(45) Date of Patent: Aug. 10, 2004

(54) TWO-WIRE TYPE REMOTE CONTROL SYSTEM AND DISPLAY DEVICE

(75) Inventor: Kiyoshi Tada, Tokyo (JP)

(73) Assignee: AIOI Systems Co., Ltd., Tokyo (JP)

( * ) Notice: Subject to any disclaimer, the term of this patent is extended or adjusted under 35 U.S.C. 154(b) by 428 days.

(21) Appl. No.: 09/821,275

(22) Filed: Mar. 29, 2001

(65) Prior Publication Data

US 2002/0003513 A1 Jan. 10, 2002

(30) Foreign Application Priority Data

Jul. 7, 2000 (JP) ....................................... 2000-206819

(51) Int. Cl.[7] ......................... G02B 23/00; H04M 11/04

(52) U.S. Cl. .............................. 340/825.52; 340/693.1; 340/310.01

(58) Field of Search ........................... 340/693.1–693.5, 340/310.01–310.08, 825.98, 825.52, 5.91, 5.92; 700/22; 345/2.1; 235/385, 383

(56) References Cited

U.S. PATENT DOCUMENTS 4,684,944 A * 8/1987 Kerlin ................... 340/825.66

4,910,628 A * 3/1990 Minagawa et al. ........... 361/84

5,196,823 A * 3/1993 Formigoni ............. 340/310.01

5,245,534 A * 9/1993 Waterhouse et al. .......... 705/28

5,455,761 A * 10/1995 Kushiro et al. ............... 700/22

5,467,474 A * 11/1995 Ackerman et al. ............ 705/22

5,784,626 A * 7/1998 Odaohara ................... 713/300

* cited by examiner

*Primary Examiner*—Michael Horabik

*Assistant Examiner*—Nam V Nguyen

(74) *Attorney, Agent, or Firm*—Bachman & LaPointe, P.C.

(57) ABSTRACT

A receiver side of a two-wire type remote control system accurately determines the polarity of data. The reception buffer inverts an input from one of the data and electric communication lines, and adds the inverted input to an input of the other line. Then, when the result of the addition is 0 or close to 0, the reception switches buffer logic data to be output to indicate the inversion of the level of the equilibrium pulse-like power received from the communication lines. The polarity identifying portion identifies the polarity when the logical data sent from the reception buffer is maintained at a logic level for a predetermined period of time. The polarity identifying portion sends pulse group data to the data processing portion in accordance with the identified polarity.

9 Claims, 10 Drawing Sheets

TWO-WIRE TYPE REMOTE CONTROL SYSTEM AND DISPLAY DEVICE

CROSS-REFERENCE TO RELATED APPLICATIONS

This application is based upon and claims the benefit of priority from the prior Japanese Patent Application No. 2000-206819, field Jul. 7, 2000, the entire contents of which are incorporated herein by reference.

BACKGROUND OF THE INVENTION

1. Field of the Invention

The present invention relates to a display device which is used, for example, in a remote data control system and to-be-controlled device, in which transmission/reception of power and data communication between the control device and one or more devices to be controlled, are carried out via two power lines (we refer to the display device as a two-wire type display device, hereinafter). The two-wire type display device is used as a stock display device and price display device, which may be attached to, for example, a display shelf on which various types of sales products are displayed.

2. Description of the Related Art

There are conventionally several types of methods each known as a technique for carrying out data and electric transmission/reception communication which is conducted with use of two power lines. One (called the first method here) is that a high-frequency signal is superimposed on a power line in a transmitter side, and transmitted, and only the high-frequency signal is extracted by means of a band-pass filter on a receiver device side. Another one (called the second method here) is that a pulse signal whose phase is modulated is superimposed on two-wire type DC power lines and then transmitted on the transmitter side. Still another one is that a DC power is transformed into a pulse by periodically disconnecting or short-circuiting one of the two DC power lines, and transmitted on the transmitter side and such a pulse signal is separated with use of a pulse transformer on the receptor device.

With the first method, it is not easy to clear the problem of leakage which is innately entailed to a high-frequency signal or its anti-noise property. For this method, a complicated circuit structure or circuit parts having particularly high characteristics must be employed for modulation, and therefore the production cost becomes remarkably high. The second method requires phase separation and therefore it has a certain limitation in the transmission speed. The third method can simplify the circuit structure, but entails the problem of noise in any way. In any of the above-described cases, it is very difficult to use a great number of receiver devices if the transmission efficiency is taken into consideration.

As a solution to the above-described drawback of the conventional techniques, the applicant of the present invention proposed before a two-wire type data and electric transmission/reception communication technique capable of high-speed and high anti-noise mutual communications between transmitter and receiver, as well as using a plurality of receiver devices, without having leakage of a transmitted power (Japanese Patent No. 2787976).

According to this technique, to summarize, a transmitter-side device is structured such as to make power levels on two power lines into equivalent pulse-like power on the basis of pulse group data containing the address and instruction data of a receiver-side device. Further, the receiver-side device is structured such as to rectify the equivalent pulse-like power received from the two power lines and store it, and to make power levels on the two power lines into equivalent pulse-like power on the basis of pulse group data containing the address of the self device and the data addressed to the transmitter-side device. In each side, the power supply is stopped while receiving power.

However, the above-described two-wire type data and electric transmission/reception communication technique still entails a drawback to be solved.

More specifically, in the case where the transmission and reception of power and data communication are conducted through the two-wire type device, there is a possibility of misjudging the polarity of data when pulse group data flow in time-series. The judgment of the polarity of data has an influence on the contents of the pulse group data after they are recognized by the receiver-side device. Therefore, it is extremely importance to accurately judge the polarity, for example, in the case where a power receiver device is remotely controlled by a power transmitter device.

In most of the cases, a receiver device can be set on or removed from the power line while the line is in an active state (that is, it can be replaced while current is being carried through the line). However, in order to accurately judge the polarity of data, it is necessary to turn off the entire system including the transmitter-side device when a receiver device is set on (into a state where current is not carried). Therefore, in the case of such a system that involves a great number of receiver devices, the operation of these devices is greatly influenced.

Data stored in a receiver device is usually utilized independently within the device itself, and therefore it is not possible to write arbitrary data therein from the receiver side or to read such data at an arbitrary time. If such writing or reading of data can be performed flexibly, it is expected to facilitate the remote control of the receiver-side device by the transmitter-side device while the transmitter device monitoring the receiver device.

Since the receiver device uses the stored power as its power source, it is important for it to reduce the power consumption as much as possible. Therefore, there must create here an inventive idea to maintain the best possible performance in function while keeping the structure of the hardware which consumes the power should be limited to the minimum necessary level. Especially when the receiver-side device includes display means, the power consumption by the display device cannot be neglected.

SUMMARY OF THE INVENTION

The present invention has been proposed to solve the above-described drawback of the conventional technique, and its main object is to provide a two-wire type remote control system which can accurately judge the polarity of data on a receiver side.

Another object of the present invention is to provide a two-wire type remote control system of a general usage of a wide variety, having so various functions and yet suppressed power consumption.

According to a first aspect of the present invention, there is provided a two-wire type remote control system comprising: a wiring case including two power lines; a control device comprising: a generator for generating pulse group data representing an assigned address of a target device to be controlled and control data addressed to the target device; and a power controller for converting DC power into power in equilibrium pulse waveform according to the generated pulse group data, and supplying the converted power to the two power lines; and at least one device to be controlled which is removably attached to the wiring case such that the control device ant the at least one to-be-controlled device are electrically connected to each other via the two power lines, comprising: a charger for rectifying the converted power received from the two power lines, to be charged therein; a polarity identifying circuit for detecting continuation of a logical level of the pulse group data included in the received power for a certain period of time, and identifying a polarity of the pulse group data; a data processor for determining whether or not the assigned address of the self device is included in the received power according to the identified polarity, extracting control data from the pulse group data when the assigned address of the self device is included in the received power, and executing data processing according to the extracted control data; and a display for displaying a result of the data processing by the data processor.

It may be arranged that the at least one to-be-controlled device further comprises: a data generator for generating another pulse group data representing the assigned address of the self device and response data to the control device; and a power controller for converting the power stored by the charger into power in equilibrium pulse waveform according to the another pulse group data, and supplying the converted power to the two power lines, and the control device further comprises a data processor for, when the power supply to the at least one to-be-controlled device is stopped by the power controller of the control device, receiving the power from the at least one to-be-controlled device via the two power lines, and decoding the another pulse group data included in the received power.

It may be arranged that the at least one to-be-controlled device further comprises a non-volatile memory which is readable by the data processor of the at least one to-be-controlled device, and the data processor of the at least one to-be-controlled device executes the data processing such that data writing or data reading into/from the non-volatile memory is selectively executed according to a request from the control device.

According to a second aspect of the present invention, there is provided a two-wire type display device which is removably attached to a wiring case including two power lines, and electrically connected to a control device via the two power lines in the wiring case, the control device converting, DC power into power in equilibrium pulse waveform according to pulse group data representing an assigned address of a target destination and control data to the target destination, and supplying the converted power to the two power lines, the two-wire type display device comprising: a charger for rectifying the converted power received from the two power lines, to be charged therein; a polarity identifying circuit for detecting continuation of a logical level of the pulse group data included in the received power for a certain period of time, and identifying a polarity of the pulse group data; a data processor for determining whether or not the assigned address of the self device is included in the received power according to the identified polarity, extracting control data from the pulse group data when the assigned address of the self device is included in the received power, and executing data processing according to the extracted control data; a display for visualizing a result of the data processing by the data processor; a receiver for receiving a data input from an external device; a data generator for generating another pulse group data representing the assigned address of the self device and response data to the control device, the response data including the data input received by the receiver; and a power controller for converting the power stored by the charger into power in equilibrium pulse waveform according to the another pulse group data, and supplying the converted power to the two power lines.

It should be noted here that in place of the display, audio means for notifying by sound, such as a buzzer, can be used. In this case, the result of the data processing is represented by the buzzer sound or voice.

It may be arranged that the display is designed to indicate a letter, a symbol, and/or a numeral by way of a combination of a plurality of display segments thereof, and the display device further comprises a display test circuit for carrying out a display test by turning on the segments one by one consecutively.

With such a display test circuit, the power consumption for a segment test can be significantly reduced, and therefore the device can be operated on stored power without a problem of power shortage.

It may be arranged that the display has a switch for revising a content of display, and the switch is designed to change a display function usually assigned to another display function by means of a software operation. With this structure, so various functions can be realized at a less hardware resource.

It may be arranged that the display device further comprises: a switch for outputting a pulse signal representing one of binary values when the switch is pressed down and a pulse signal representing the other of the binary values when a pressed-down state of the switch is released; and a switch data generator for, when an output value from the switch is changed, generating switch data representing such a change, wherein the switch data is reflected in contents of the response data.

With this structure, a pulse signal is output not only when the switch is pressed down, but also the press-down state is released, and therefore switch data can be generated regardless of the pressing time period of the switch.

It may be arranged that the display device further comprises a pair of wiring members which are connected to the two power lines, respectively upon being attached to the wiring case, wherein a contact point of each of the wiring members is brought into elastic contact with respective one of the power lines.

It may be arranged that the display device further comprises an elastic engagement mechanism for engaging itself to the wiring case by applying a force onto the body of the device in a first direction, and removing it from the wiring case by applying a force thereto in a second direction which is different from the first direction.

BRIEF DESCRIPTION OF THE DRAWINGS

These objects and other objects and advantages of the present invention will become more apparent upon reading of the following detailed description and the accompanying drawings in which.

Figure 2A:
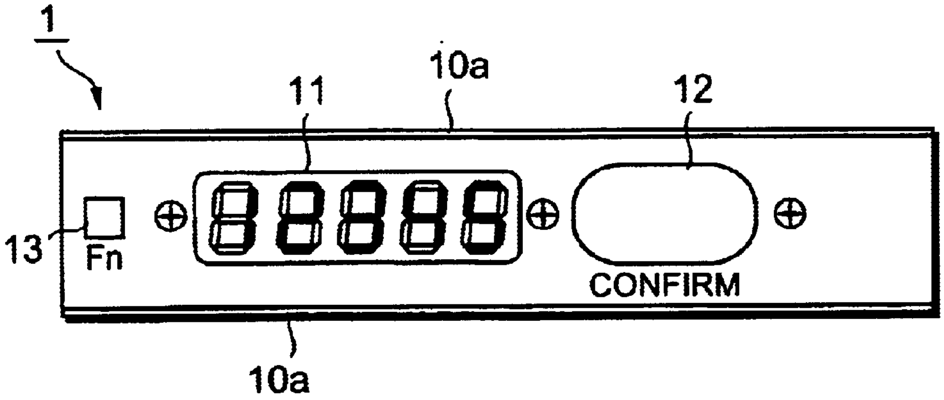
FIGS. 2A to 2E are diagrams illustrating an appearance of the display device of the two-wire type remote control system, FIG. 2A being a front view of the display device 1, FIG. 2B being a side view, FIG. 2C being a rear view, FIG.
Figure 2B:
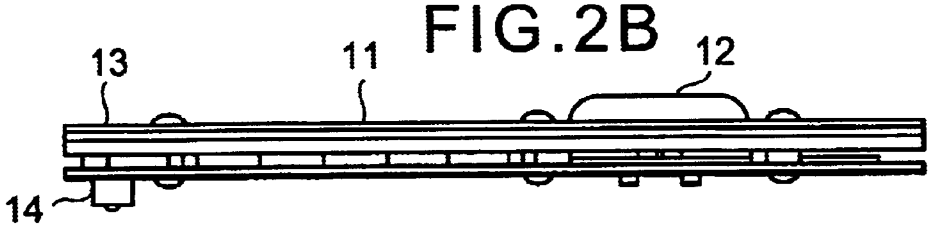
Figure 2C:
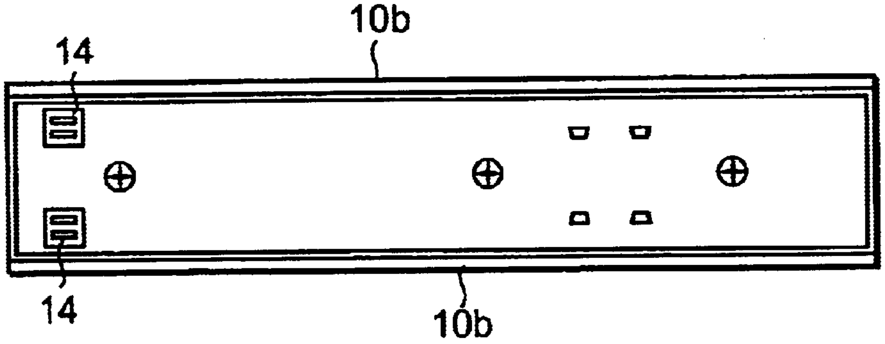
Figure 2D:
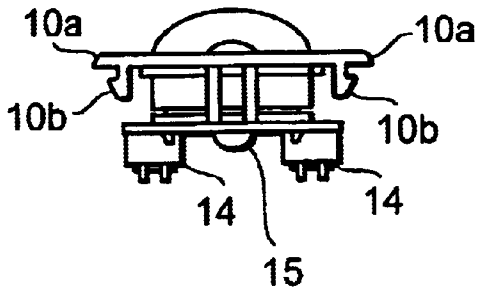
Figure 2E:
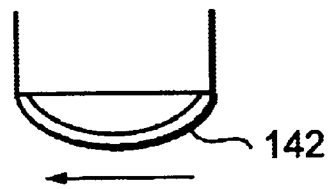
Figure 3:
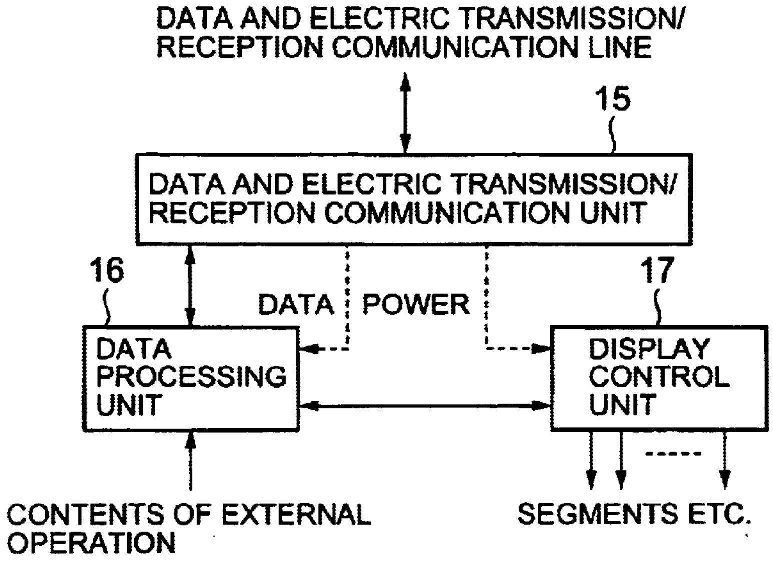
Figure 4:
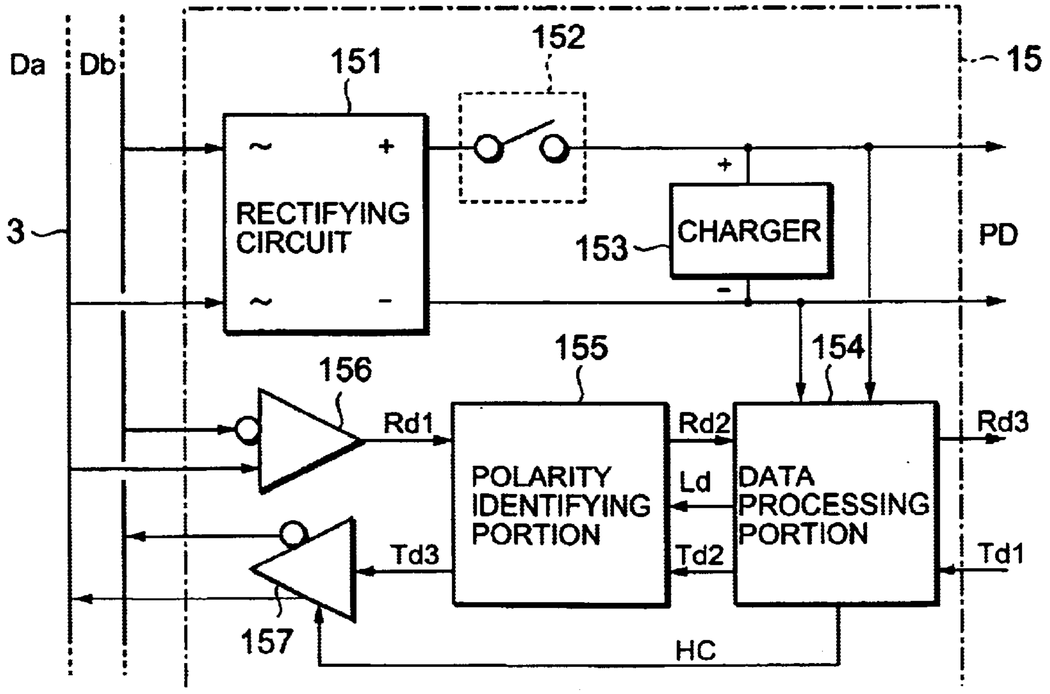
Figure 5:
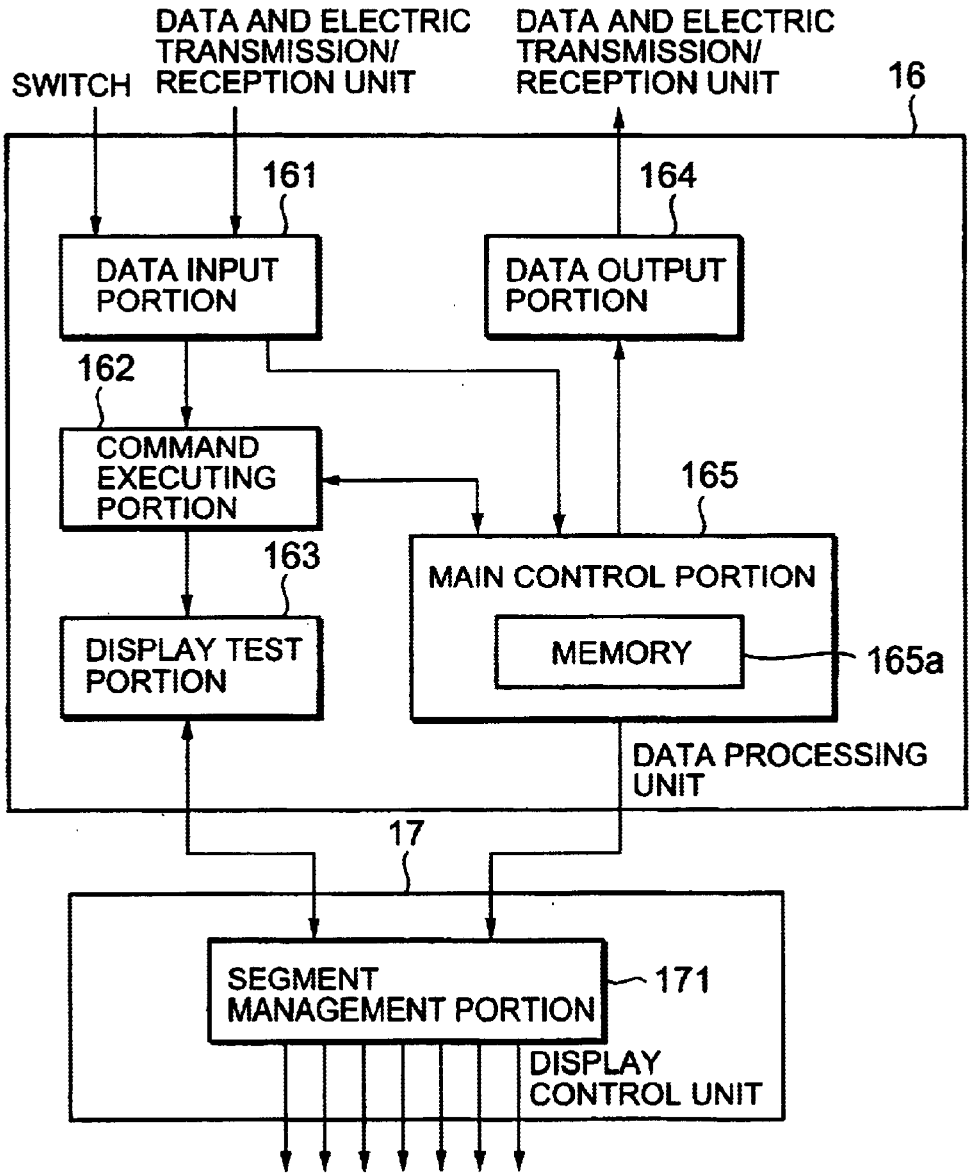
Figure 6A:
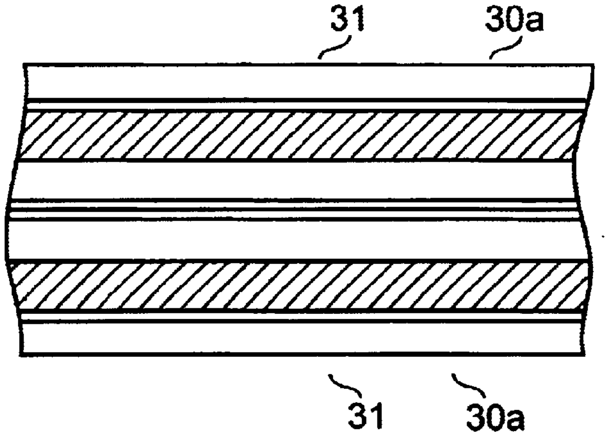
Figure 6B:
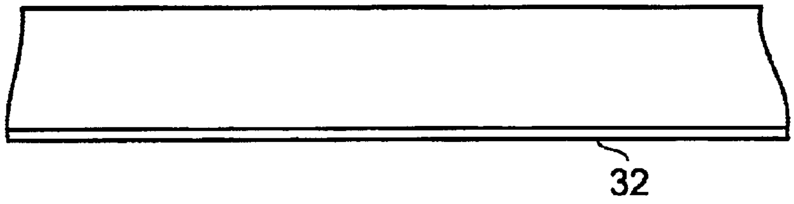
Figure 6C:
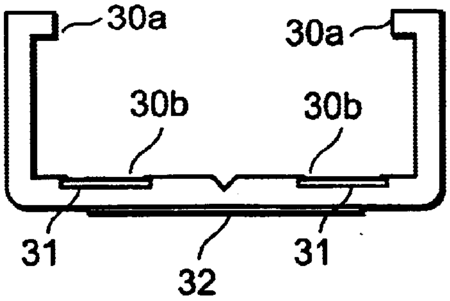
Figure 6D:
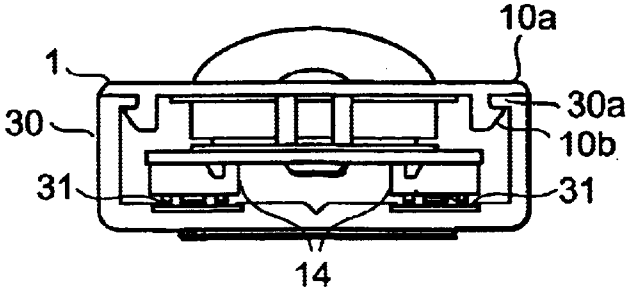
Figure 7:
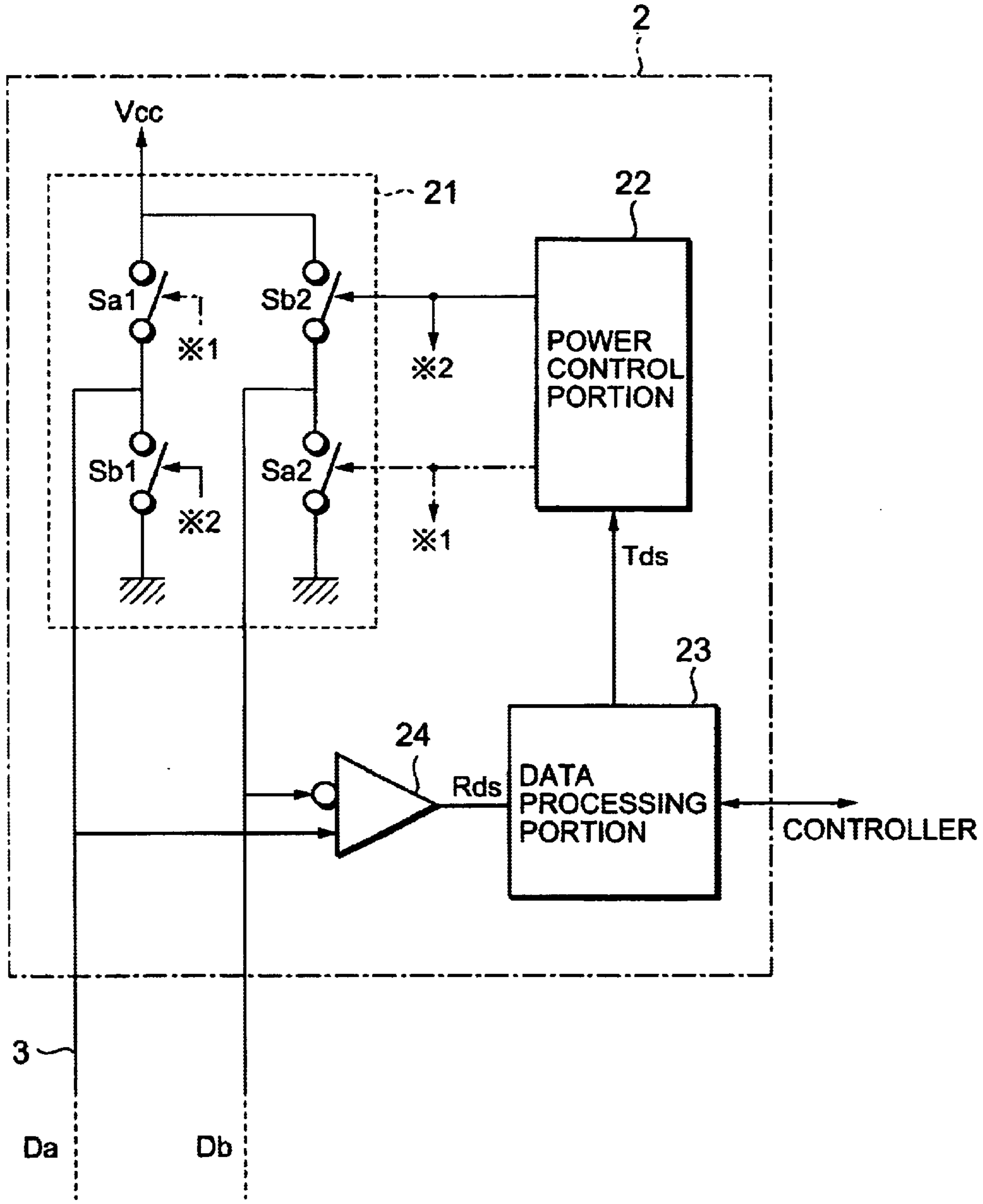
Figure 8:
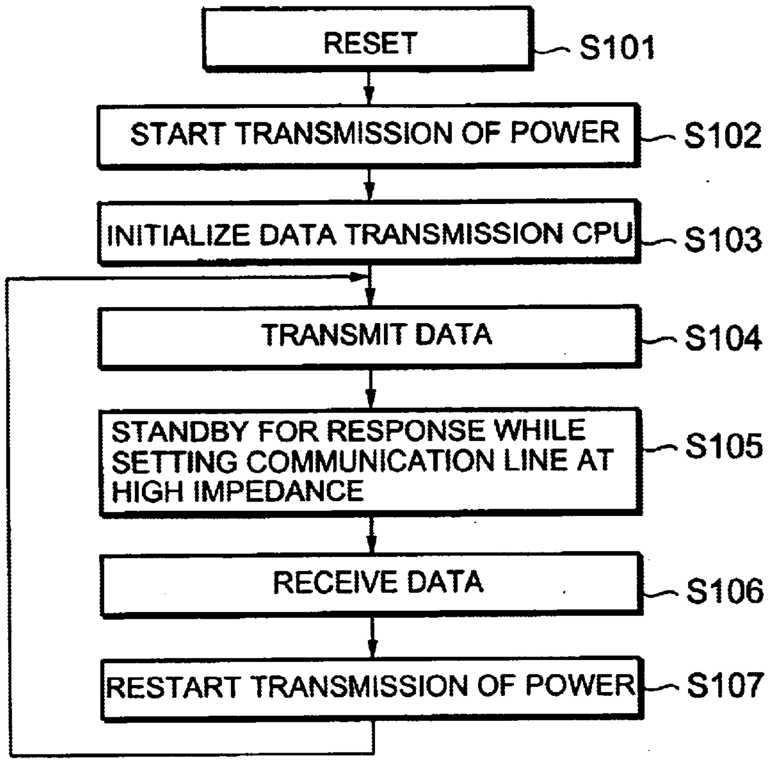
Figure 9:
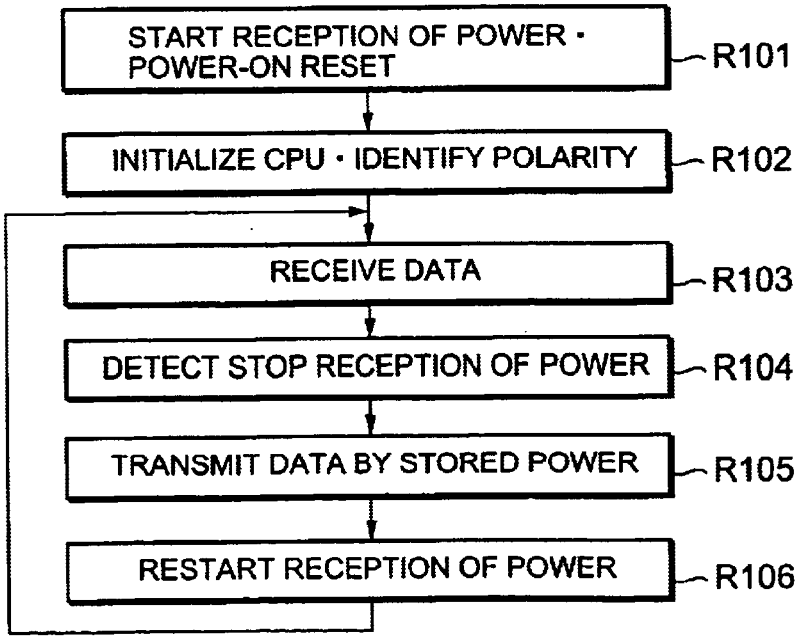
Figure 10:
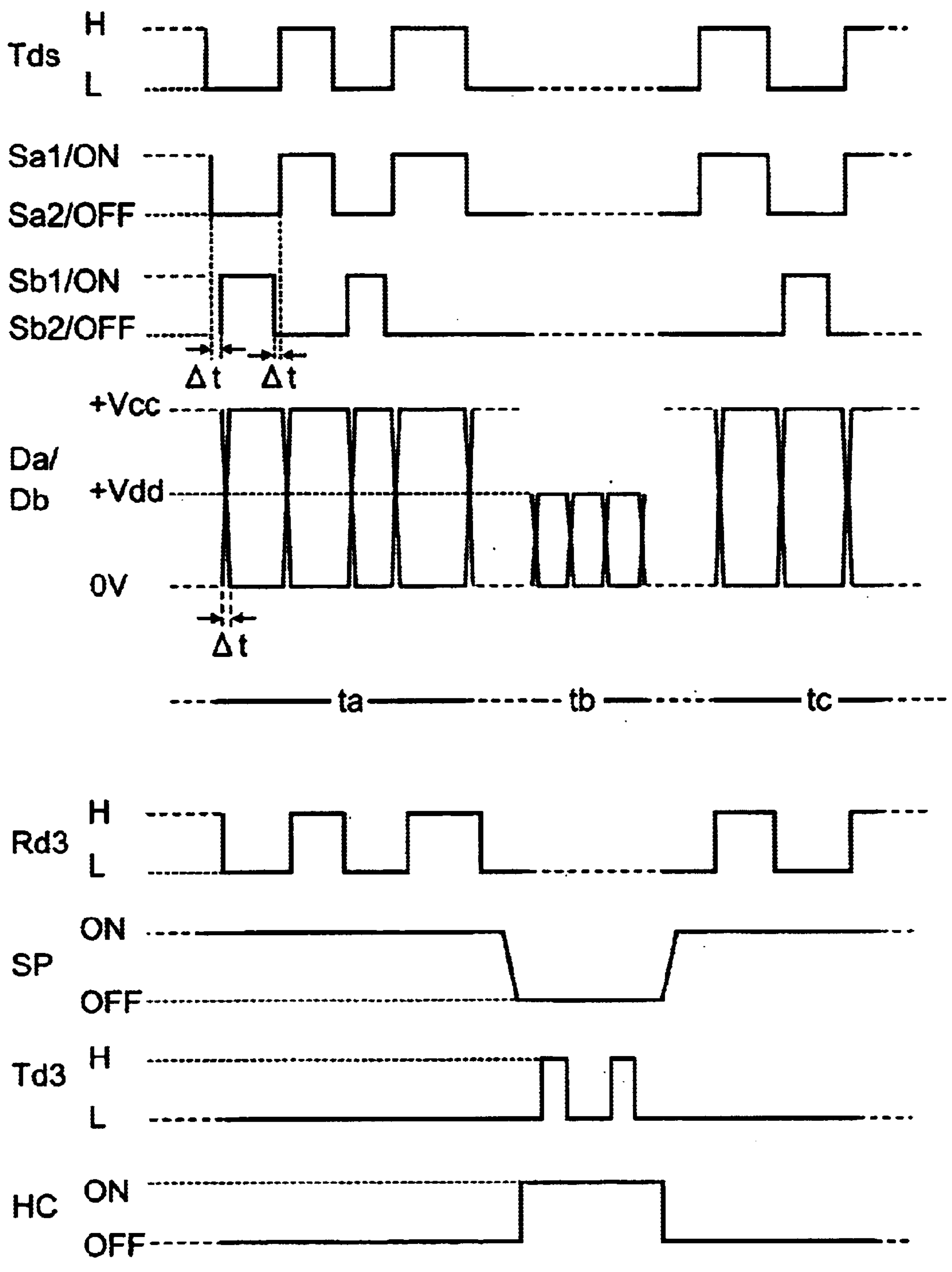
Figure 11A:
Figure 11B:
Figure 12:
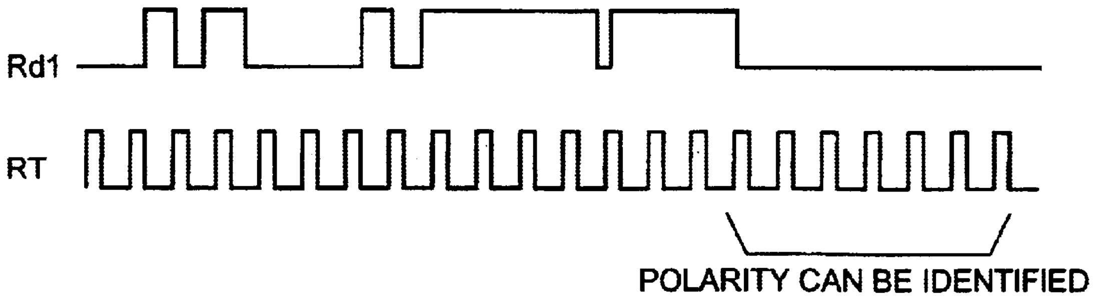
Figure 13:
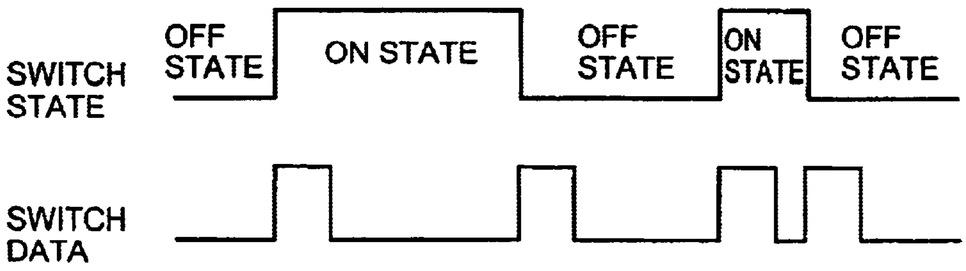
Figure 14:
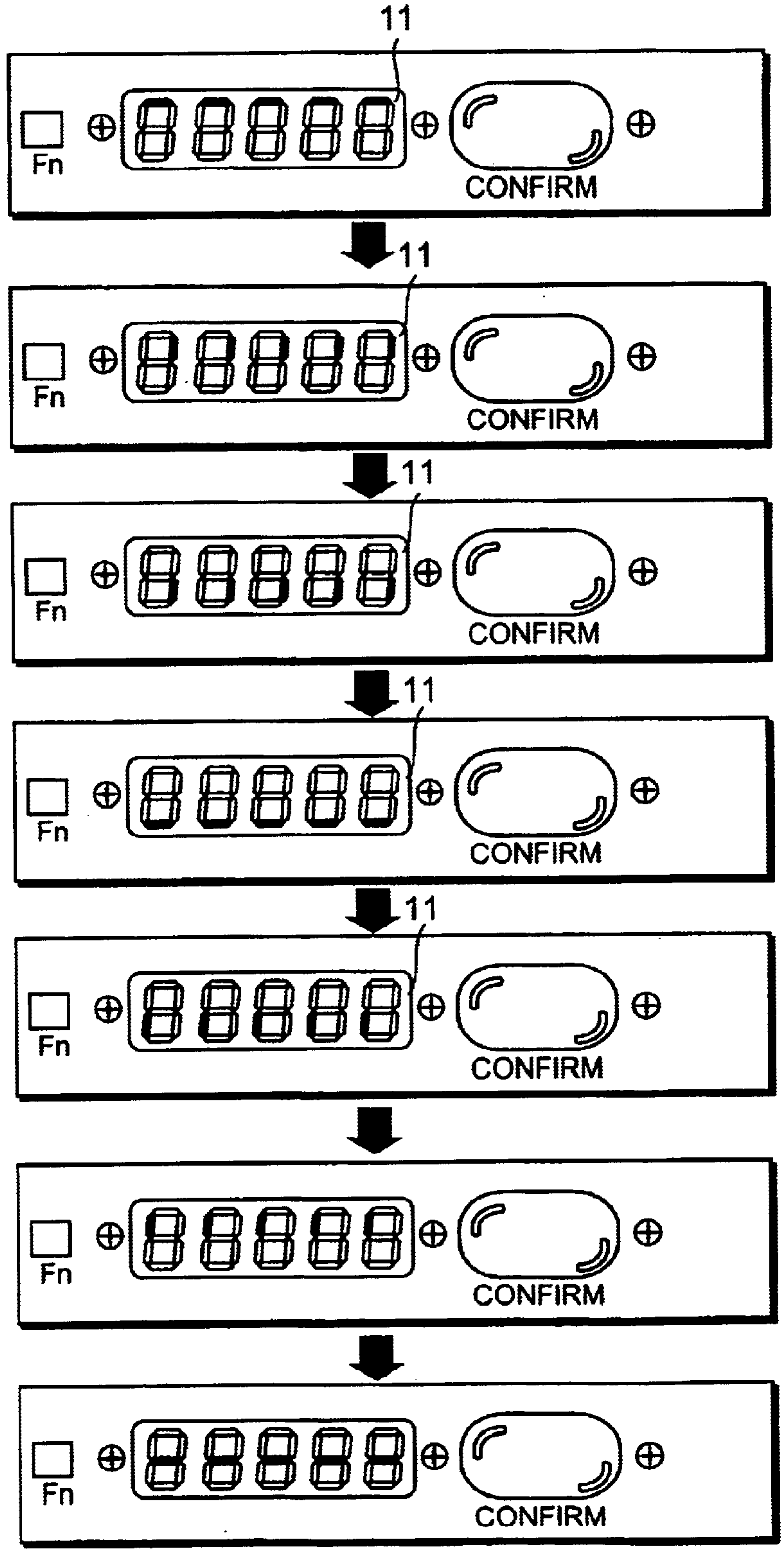

2D being a view where the device is observed from the direction indicated by an arrow shown in FIG. 2C, and FIG. 2E being a partially enlarged view of FIG. 2D;

FIG. 3 is a diagram briefly illustrating the functional structure of the display device;

FIG. 4 is a diagram illustrating the transmission/reception electric communication unit of the display device in detail;

FIG. 5 is a diagram illustrating the functional structures of the data processing unit and display control unit of the display device;

FIGS. 6A to 6D are diagrams illustrating an appearance of the wiring case, FIG. 6A illustrating a top view, FIG. 6B illustrating a side view, FIG. 6C illustrating a front view in cross section, and FIG. 6D illustrating a front view in cross section, when the display device is mounted; and FIG. 7 is a diagram illustrating the structure of the main portion of the two-wire type remote control system;

FIG. 8 is a diagram of the processing procedure, designed to illustrate the operation of the monitor control device;

FIG. 9 is a diagram of the processing procedure, designed to illustrate the operation of the display device;

FIG. 10 is an explanatory diagram illustrating the operation of each unit, the data or change in power waveform when the electricity and data are actually transmitted or received in the two-wire type remote control system;

FIGS. 11A and 11B show examples of format of pulse group data, with FIG. 11A illustrating an example of the format of pulse group data sent from the monitor control device to the display device, and FIG. 11B illustrating an example of the format of pulse group data sent from the display device to the monitor control device;

FIG. 12 is a diagram illustrating an example of timing of the polarity identifying process in the display device;

FIG. 13 is a diagram illustrating an example of timing of the switch data for detecting the state of switches in the display device; and FIG. 14 is a diagram illustrating how each segment is lit consecutively one after another in a display test carried out on the display portion of the display device.

DETAILED DESCRIPTION OF THE PREFERRED EMBODIMENTS

A preferred embodiment of the present invention will now be described in detail with reference accompanying drawings. It should be noted that the present embodiment will be explained in connection with the case of a game device which is equipped with the image processing device of the present invention.

In the following description, the present invention will be discussed in connection with the case where the two-wire type remote control system of the present invention is applied to management of commercial products displayed on a product display shelf.

Figure 1:
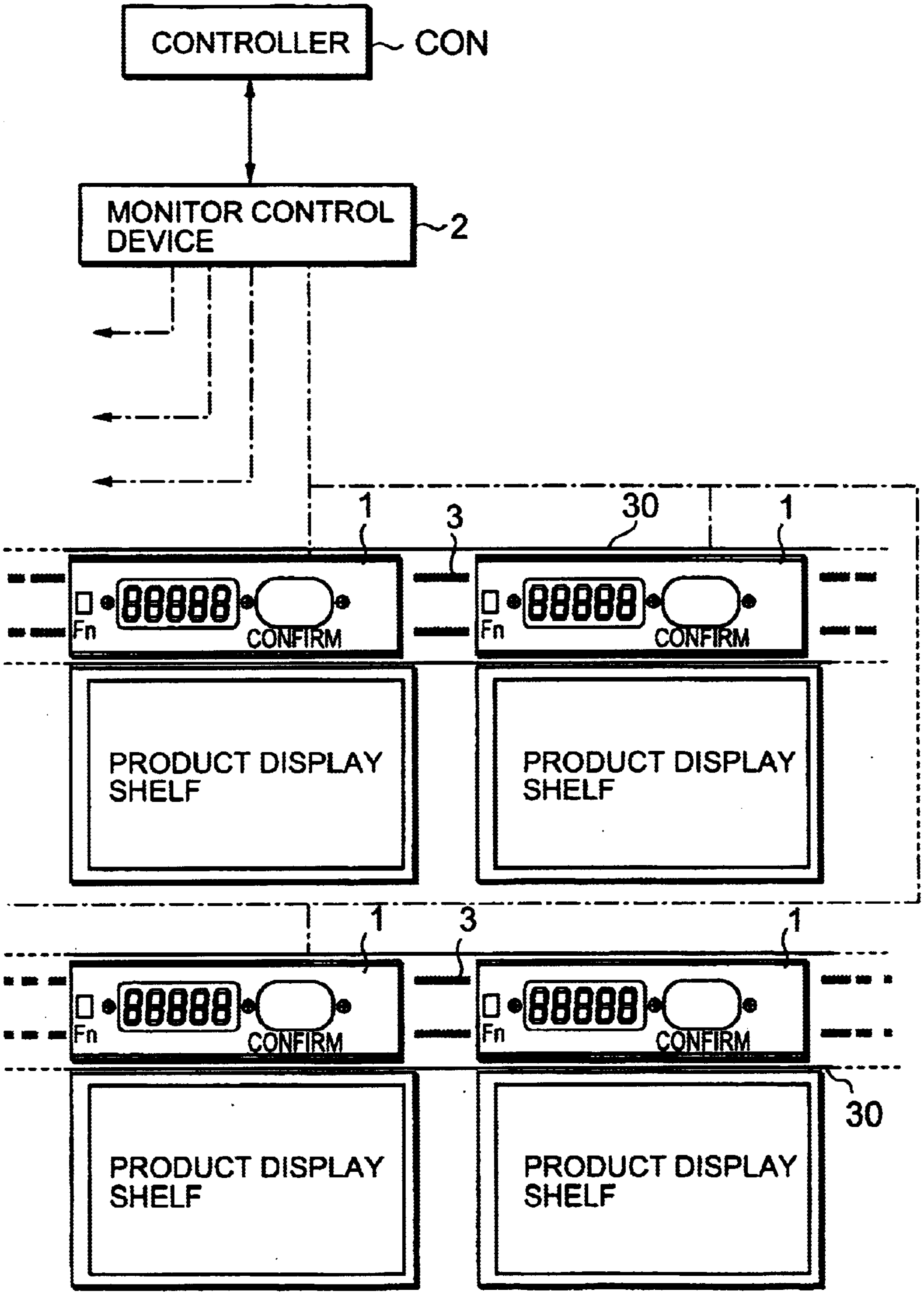
FIG. 1 is a diagram illustrating the entire structure of the case where the two-wire type remote control system according to the present invention is applied to management of commercial products arranged in a product display shelf.

As shown in FIG. 1, the remote control system has a structure, in which a plurality of display devices 1, each of which is an example of device to be controlled, and a monitor control device 2, which is an example of the control device are provided in such an arrangement as to establish communications for transmitting/receiving electricity and data between them via two electric power lines 3 (to be called "data and electric transmission/reception communication" hereinafter). To the monitor control device 2, a controller CON for managing the data of commercial products is connected. The two power lines 3 are arranged to be substantially parallel to each other on an inner bottom surface of a wiring case 30 having substantially a rectangular cross section, and they are electrically connected to an electronic part of a display device 1 when the display device 1 is mounted on the wiring case 30. The wiring case 30 is provided at a predetermined site on the product display shelf. Hereinafter, the two power lines 3 are expressed as "data and electrical transmission/reception communication lines" except for the case where the structure of themselves is explained.

It should be noted that in FIG. 1, electrical connections between these devices are indicated with chain lines in order to clearly illustrate the connections between these display devices and the monitor control device 2.

The contents of the data and electrical transmission/reception communication s from the monitor control device 2 to the display devices 1 are mainly supply of power and transmission of control data for commands, and related data. On the other hand, the data and electrical transmission/reception communication s from the display devices 1 to the monitor control device 2 are transmissions of execution results of the commands and state data indicating the state of the devices themselves.

For the data and electrical transmission/reception communication, 4-digit address assigned for each of the display devices 1 are used. The address is expressed in either way of BCD (binary-coded decimal) or 4-digit one (1–7999). In some command, it is possible to assign a wild card. Assigning of a wild card is to assign "?". Examples of the commands are reset, signal output, start control, acquisition of input data, display of 1-input conversion state of a unit after starting control, stop control, and unit address setting.

The communication protocol in the monitor control device 2 is common to all of the display devices 1.

Display Device

Next, an example of the hardware structure of the display device 1 will now be described.

FIG. 2A is a front view of the display device 1, FIG. 2B is a side view, FIG. 2C is a rear view, FIG. 2D is a view where the device is observed from the direction indicated by an arrow shown in FIG. 2C and FIG. 2E is a partially enlarged view of FIG. 2D.

Each of the display devices 1 has a resin-made box having such a shape of rectangle when viewed from its front, which can serve as a cover of the wiring case 30. The box has elastic engagement mechanisms 10*a* and 10*b* formed integrally with the box, at its side end portions in the longitudinal direction thereof. More specifically, at each of end portions of the front side of the box, a taper-shaped holder portion 10*a* is formed so that it can be easily held by the operator. Further, at each of end portions of the rear side of the box, an engagement portion 10*b* is integrally formed to engage with the sidewall of the wiring case 30, which will be later explained. With the elastic engagement mechanisms 10*a* and 10*b*, as a force is applied to the box in the inner bottom surface direction (that is, the first direction) of the wiring case 30, the engagement portion 10*b* is engaged with the wiring case 30, whereas as a force is applied in the direction where the holder portion 10*a* is held (that is, the second direction), the display device 1 can be easily detached from the wiring case 30.

On the surface of the box, a display portion 11 made of a plurality of LEDs having a 7-segment structure, for expressing letters, symbols and numerals, a lamp switch 12 for inputting data, and a bottom switch 13 used for canceling an item displayed on the display portion 11, or revising the display contents on the display portion 11 are provided. These switches 12 and 13 are pushed or released so as to output either one of the binary signals to a data processing unit 16, which will be later explained.

On the rear surface of the box, a pair of wiring members 14 is mounted. In this embodiment, a transmission/reception electric communication unit 15, the data processing unit 16 and a display control unit 17 are integrated in one IC, and they will not be illustrated in the figure. Each of the wiring members 14 is designed such that the contact point made at its end portion is brought into contact elastically with the transmission/reception electric communication line 3 when the display device 1 is mounted to the wiring case 30. More specifically, as shown in FIG. 2E, each wiring member 14 and a metal thin plate 142 which is shaped to curve are electrically connected. Further, the metal thin plate 14 serves as the contact point, so as to bring the wiring member 14 into contact elastically with the transmission/reception electric communication line 3 in the wiring case 30. With the above-described structure, each of the power lines of the transmission/reception electric communication line 3 is electrically connected with the contact point of each of the wiring members 14 without fail.

Next, the functional structure of the display device 1 will now be described.

As briefly shown in FIG. 3, the display device 1 includes the data and electric transmission/reception electric communication unit 15 which is connected to the electric transmission/reception electric communication lines 3 when the box thereof is mounted to the wiring case 30, and the display control unit 17 which carries out data processing on the basis of a command from an external operation or a monitor control device 2. The data processing unit 16 and the display control unit 17 are operated by a DC power (storage power) supplied as a power source from the data and electric transmission/reception electric communication unit 15. It should be noted here that in FIG. 3 (or FIG. 5, which will be later explained), the data and electric transmission/reception electric communication unit 15, the data processing unit 16 and the data control unit 17 are illustrated separately from each other; however it is possible to realize these units in such a form that they are integrated in one IC.

FIG. 4 shows a detailed structure of the data and electric transmission/reception electric communication unit 15.

More specifically, the data and electric transmission/reception electric communication unit 15 includes the following elements. Note that the reference numerals put in parentheses indicate those used in the figure.

(151) Rectifying Circuit

This circuit converts powers received via the power line 3, into DC powers (voltage) by bridge rectification.

(152) Voltage Comparing Portion

This element judges whether or not a rectified voltage is equal to or higher than a predetermined voltage value Vdd (<Vcc).

(153) Storage Unit 153

This element stores the electricity when the rectified voltage is Vdd or higher. An electrolytic capacitor may be used.

(156) Reception Buffer

This element converts level inversion data of an equilibrium pulse-like power received via the power line 3 into logical data Rd1 which is a combination of logic "1" and logic "0", and send it to a polarity identifying portion 155. More specifically, an input from one of the data and electric communication lines 3 is inverted, and the inverted input is added to an input of the other line. When the result of the addition is 0 or close to 0, logic data Rd1 to be output to indicate the inversion of the level of the equilibrium pulse-like power received from the communication lines 3, is switched.

(155) Polarity Identifying Portion

This element identifies a power level on the power line 3 on the basis of the logical data Rd1 sent from the reception buffer 156 so as to unify the initial logic level recognized by the transmission/reception electric communication unit 15, at logic "1" (or logic "0"). The logic data Rd1 takes logic 1 if the amplitude difference of the equilibrium pulse-like power, which will be explained later, is positive with respect to the reference level, or takes logic 0 when the difference is negative. The specific method for judging the polarity will be described later.

(154) Data Processing Portion 154

This element generates data for identifying the self device (self device address) and pulse group data indicating the data contents addressed to the monitor control device 1, and executes a desired data process. The data processing portion 154 is established in such a structure that a program code recorded in a memory region (not shown) is read and executed by the CPU (omitted from the figure) of the main device, and it executes a data comparison process for detecting the address to the self device and electricity reception stopper data, that is, delimiter (data transmission end signal), from the logic data Rd1 converted by the reception buffer 156, and a process for generating a control signal used when a stored power is taken in from the storage device 153 upon detection of one of the above-mentioned data, and the power is transmitted via the transmission/reception electric communication line 3.

(157) Transmission Buffer 157

This element controls the power supply to the power line 3 on the basis of the control signal and a signal Td3 outputted from the polarity identifying portion 155.

The storage power PD stored in the storage device 153 is sent to the data processing unit 16 and to the display control unit 17. Further, the contents of the display control can be identified on the basis of data Rd3 outputted from the data processing unit 154, or the contents of the operation performed by the operator can be inputted to the data processing portion 154 to be transmitted to the monitor control device 2.

FIG. 5 shows an example of the functional block structure of the data processing unit 16 and the display control unit 17.

The data processing unit 16 includes the following elements in its structure.

(161) Data Input Portion

This element inputs switch state data indicating a press-down state of the switches 12 and 13 shown in FIG. 2, or a press-down release state, and reception data Rd3 sent from the data and electric transmission/reception electric communication unit 15. In the case where the input data is a command, the command is sent to a command executing portion 162, while the other data are sent to the main control portion 165.

(162) Command Executing Portion

This element judges the contents of a command sent from the monitor control device 2 or a command (command made by the external operation) input through the switches 12 and 13, and sends an instruction to a display test portion 163 or a main control portion 165 in accordance with the contents of the judgment.

(163) Display Test Portion

This element carries out the operation test of the display portion 11 in accordance with the instruction made by the command executing portion 162. The contents of the operation test will be explained later.

(164) Data Output Portion

Data addressed to the monitor control device 2, which is generated as a result of the data processing, and in the self device, is output to the data and electric communication unit 15.

(165) Main Control Portion

This element controls the operation timing within the unit comprehensively

Further, this element has a function of controlling recording of data onto a non-volatile memory 165*a*, or reading of data recorded in the memory. More specifically, desired data can be recorded on the non-volatile memory 165*a* or read therefrom in accordance with the contents of a command from the monitor control device 2 or a command made by the external operation. In this manner, it becomes possible to record or read external data, which is not possible with the conventional technique.

Further, functions assigned to the display portion 11 and the switches 12 and 13 in default are dynamically changed to other functions. For example, the display portion 11 usually displays data from the monitor control device 2; however the main control portion can make it possible for the display device to display data generated by the display portion 11, or it can make the data contents of the case where the lamp switch 12 or the button switch 13 is pressed down, and the display contents of the display portion 11 changed in accordance with an instruction (command) from the monitor control device 2. Further, it is possible to have a structure in which the button switch 13 has a function of increasing (+) or decreasing (−) data (numerical value) on the display device 11 consisting of a plurality of LEDs of a 7-segment structure. In this manner, it is possible to achieve a variety of functions for a less hardware resource. In the case of the device which operates on the storage power supplied via the data and electric communication as in the display device 1 of this embodiment, the utility of such functions is very high.

The data processing unit 16 is designed to assist the data processing portion 154 of the data and electric transmission/reception communication unit 15, and as the CPU of the device reads a program code recorded in the memory area (not shown) to be executed, the various functional blocks are realized.

The display control unit 17 has a segment management portion 171. The segment management portion 171 is designed to visualize the contents to be displayed, by putting on/off light in the segments of the display portion, which will be explained later.

Wiring Case

Next, the wiring case 30 of the embodiment will now be described.

FIGS. 6A to 6D illustrate an example of the structure of the wiring case, FIG. 6A illustrating a top view, FIG. 6B illustrating a side view, FIG. 6C illustrating a front view in cross section, and FIG. 6D illustrating a front view in cross section, when the display device 1 is mounted. In this example, the wiring case 30 is prepared by forming a resin-made long box having a cross section of a U shape. In an inner side of the bottom surface portion of the case, conductive plates 31 serving as the data and electrical transmission/reception communication lines 30 are arranged to be substantially parallel with each other. The inner bottom surface portion is formed to be planar so that the area defined by one side in its longitudinal direction and another side on the other side can be used entirely for the installation of the conductive plates 31.

Here, since the conductivity of a conductive plate 31 is determined by its cross sectional area, as the conductivity is increased, the voltage drop is decreased. Therefore, the conductive plates 31 can be elongated or enlarged. This means that for DC power of the same value, the wiring case can be elongated further, and therefore a greater number of display devices 1 can be mounted in the same wiring case 30, or that the DC power applied to a conductive plate 31 can be decreased, or that the distance between conductive plates 31 can be expanded, thus making it possible to prevent the interference between them. For this reason, in this embodiment, the bottom surface portion of the wiring case 30 is formed such that the area of the bottom surface can be made as large as possible.

The wiring case 30 has an open section on an opposite side to its bottom surface portion, and a stopper portion 30*a* is formed at an end of a sidewall of the box in the open section side. Each of the stopper portion 30*a* is designed to detachable stop the engagement portion 10*b* of the display device 1. In order to detach each display device 1 from the stopper portions 30*a*, a force is applied so that the engagement portion 10*b* is detached from the stopper portion 30*a*. The box of the wiring case 30 is made of resin and its sidewall has a certain height. As compared to the case where there is no side wall or even there is, if the height of the wall is low, the box has more flexibility, and therefore the engagement and detachment of the engagement portion 10*b* is facilitated. It should be noted that the inner side wall of the box of the wiring case 30 will have such a height that the contact point of the wiring member 14 can be brought into contact with the conductive plate 31 when the display device 1 is mounted.

Monitor Control Device

FIG. 7 is a diagram showing the structure of the main portion of the monitor control device 2.

The monitor control device 2 includes, at least, a power source (not shown) for outputting a DC power (voltage value) Vcc, a switch group (Sa1 to Sa4) 21 for regulating electrical connection between the current power Vcc and the data and electrical transmission/reception communication line 3, a power control portion 22 for controlling open/close of the switch group 21, a data processing portion 23 for generating pulse group data containing designated address of the display device 1 and instruction data addressed to the display device 1, and executing necessary data processing, and a reception buffer 24 for converting the power level of the data and electrical transmission/reception communication line 3 into logical data so as to introduce it to the data processing portion 23. The data processing portion 23 also carries out data transfer between itself and some other external device via an external input/output terminal (not shown). The switch group 21 and the power control portion 22 constitute power control means of the supplier side.

It should be noted that although omitted from the illustration of the figure, the monitor control device 2 has an input output port to enable input of n-bit data from the display device 1, and output of m-bit data to the display device 1.

Two-line type Data and Electrical Transmission/reception Communication

Next, two-wire type data and electrical transmission/reception communication s carried out between the display device 1 and the monitor control device 2 will now be briefly described.

FIG. 8 is a diagram illustrating the processing procedure on the side of the monitor control device 2, FIG. 9 is a diagram illustrating the processing procedure on the side of the display device 1, FIG. 10 illustrates how data and electricity are actually transmitted or received via communication, and FIGS. 11A and 11B are diagrams showing a data structure in a data and electrical transmission/reception communication.

(Monitor control device to display device): time period ta in FIG. 10

On the side of the monitor control device 2, as shown in FIG. 8, the electricity supply start process (S102) is executed upon power-ON reset (S101), and the transmission CPU (hardware which establishes the data processing portion 23) is initiated (S103), thus sending to-be-transmitted data Tds to the power control portion 22 (S104).

The data Tds is pulse group data made of a combination of High level (logic “1”) and Low level (logic “0”), as indicated in an upper part of FIG. 10. The specific contents of the pulse group data are, as shown in FIG. 11A, a header (H), commands (such as reset, signal output, input disable/enable, control start, data acquisition, control stop, address setting, switch function setting, etc.), and assigned address of a subject display device 1, assigned contents (lighting numerals **, blinking switch, etc.) and delimiter (DM).

The power control portion 22 controls the switch group (Sa1 to Sa4) 21 by setting them ON/OFF in accordance with the pulse group data at a timing indicated in FIG. 10. Here, as indicated in FIG. 10, the switches Sa1 and Sa2 are controlled to be OFF, and then the switches Sb1 and Sb2 are turned ON with delay time of t. As a result, an equilibrium pulse-like power based on the current power Vcc is supplied to the transmission/reception electric communication line 3, as indicated in a middle part of FIG. 10. In the equilibrium pulse power, an interval of time t is created when the power is inverted. Therefore, it is possible to prevent short-circuiting, or generation of noise due to a harmonic component.

On the side of the display device 1, as shown in FIG. 9, when the equilibrium pulse powers (Da and Db) are supplied from the monitor control device 2, the reception of the electricity from the power lines 3 is started, and on the basis of the electrical power, the power-ON reset is executed (R101). Then, the CPU (hardware for establishing the data processing portion 154) is initiated. Further, the logical data (logic “1”/logic “0”) Rd1 contained in the equilibrium pulse power is detected by the reception buffer 156. Then, based on the logical data, the polarity is identified and set by the polarity identifying portion 155 (R102). After that, the reception of the data from the monitor control device 1 is continued for a time period of ta (R103).

(Display Device to Monitor Control Device): time period tb in FIG. 10

The monitor control device 2, after the transmission of the data Tds (after fulfilling the time period ta), sets the impedance between itself and the transmission/reception electric communication line 3 to a high impedance, and stands by for a reply from the display device 1 (FIG. 8: S105). To be specific, in the high impedance control, those switches of the switch group 21 are set in an open state (OFF state) by means of the power control portion 22, so as to cut the electrical supply of the DC power Vcc.

The display device 1, when detecting stop receiving electricity, that is, for example, when the voltage comparing portion 152 outputs a voltage drop signal SP (R104), the storage power of a peak value of Vdd, stored in the storage device 153 is used to transmit data (R105) More specifically, pulse group data Td2 is generated on the basis of the status data addressed to the monitor control device 2, and the data is converted by the polarity identifying portion 155 into polarity-set data Td3 (that is, data set to the polarity on the transmission/reception electric communication line, which is known at the start of the operation), to be guided to the transmission buffer 17. At the same time, a control signal HC is transmitted to the transmission buffer 157 in order to activate the transmission buffer 157, and an equilibrium pulse power of an amplitude of Vdd is supplied to the transmission/reception electric communication line 3. The generation process of the equilibrium pulse power is substantially the same as that of the case of the monitor control device 2; however in this example, it is carried out within the data processing portion 154.

The specific contents of data to be transmitted, that is, the pulse group data generated in the data processing portion 154, are, as shown in FIG. 11B, a header (H), the address of the self device, status data and delimiter (DM). The status data includes a reply from the monitor control device 2 on the basis of the assigned contents, the notification of the status of the self device, and others.

After transmission of the data, that is, after the supply of the equilibrium pulse power, the reception of electricity is re-started (R106).

On the other hand, during the time period tb, the monitor control device 2 is under the high impedance control, and set in such a status capable of receiving an equilibrium pulse power from the transmission/reception electric communication line 3. When an equilibrium pulse power is received, the power is converted into pulse group data Rds by the reception buffer 24, and then sent to the data processing portion 23 (FIG. 8: S106). The data processing portion 23 decodes the contents of the pulse group data Rds, and sends the result to the controller CON. After finishing the data transmission, the supply of electricity is re-started (S107). The time period tc is a period of the next cycle where the electricity is transmitted (received by the display device 1).

Next, the process executed in the display device 1 will now be described in detail.

Polarity Determining Process

First, the process by the polarity identifying portion 155 (FIG. 9: R102) will be described.

The polarity identifying portion 155 receives the logical data Rd1 sent from the reception buffer 156, and reads the power level of the logical data Rd1, thus judging the polarity (logic “1”/logic “0”) of the equilibrium pulse-like power on the communication line 3, which is recognized by the display device 1 at the time of initialization. In this operation, the identification of the polarity is not made immediately at the time of power-ON reset (FIG. 9: R101), but the logical data Rd1 is read for a certain number of times at a read timing (RT) of the polarity identifying portion 155.

Then, only if data of the same polarity are obtained consecutively for a certain number of times (for example, 7 times), the polarity is identified. (Note that in the case of what is shown FIG. 12, it is logic "0".) In this manner, even in the middle of a data and electric transmission/reception communication, or the display device 1 is mounted on the wiring case 30, the polarity can be accurately identified. Thus, it is no longer necessary to temporarily stop the entire remote control system unlike the conventional technique.

Switch State Detection Process

Next, the detection of the state of the lamp switch 12 and the button switch 13 in the data input portion 161 will now be described.

The data input portion 161 monitors the status of the switches 12 and 13 (if pressed down or not) at all times, and notifies the monitored status as switch data to the command executing portion 162 or the main control portion 165.

As shown in FIG. 13, a pulse signal of a rising edge, which is obtained when the button is pressed down, or that of a falling edge, which is obtained when the pressed-down button is released, depending upon the operation of the switches 12 and 13, is inputted to the data input portion 161 from the switches 12 and 13. The data input portion 161 allows a pulse signal having a certain interval to rise while using the rising or falling edge of the pulse signal as a trigger, and handles such a signal as switch data. The command executing portion 162 and the main control portion 165 decode the contents of the switch data thus obtained, and carry out necessary processes. The main control portion 165 further identifies the status of the lamp switch 12 or the button switch 13, and makes the result of the identification reflect in the contents of the pulse group data (status data) to be sent to the monitor control device 2.

With the above-described structure, not only the switch is pressed down, but also when the pressed switch is released, the switch data is generated. In this manner, the status of the lamp switch 12 and the button switch 13 can be accurately detected. In addition, the status where the switch is pressed down, and immediately after that the pressed switch is released (that is, switch is turned on and off within a short period of time), can be accurately detected. Thus, since the status of the switches 12 and 13 can be accurately detected, the display device 1 can be used as a switch unit for receiving data from the operator.

Display Test Process

Next, the display test process of the display portion 11 by means of the display test portion 163 and the segment management portion 171 will now be described.

As described before, the display portion 11 shown in FIG. 1 or 2 has a plurality of LEDs each of a 7-segment structure for expressing letters, symbols and numerals. The display portion 11 shown in these figures has 5 LEDs. If the segments of all the LEDs are lit for a display test, the power consumption becomes very high. Since the display device 1 is operating on the storage power, the operable time after receiving the electricity becomes very short. In order to solve this drawback, in this embodiment, all of the segments of all the 5 LEDs are not turned on at the same time for the display test, but each of the LEDs is lit one segment by one segment consecutively for a certain interval time. Such a display test is briefly illustrated in FIG. 14.

The display test illustrated in FIG. 14 is started when the display test portion 163 receives the instruction of display test from the command executing portion 162, and further the display test portion 163 transmits the control signal to the segment management portion 171. The segment management portion 171 manages arrangement data of the segments for each LED independently, and turns on the segments one by one consecutively in accordance with the control signal. When all of the segments are lit, the display is regarded as being normal, or when not, it is regarded as being abnormal. When the display is checked by human eyes, the normal/abnormal is determined by monitoring the transient of the segment lit state as shown in FIG. 14. In the case where the display is monitored remotely by the monitor control device 2, the presence/absence of a segment which is not lit is monitored by data and electric transmission/reception communication via the segment management portion 171 and the main control portion 165.

Example of Usage

An example of the usage of product management with use of the remote control system of this embodiment will now be described.

First, a manager which manages sales products designates the number of products displayed on each of sales products display shelves using the controller CON. The monitor control device 2 sends a command for displaying the number designated by the manager on the display portion 11 of each display device 1, to the communication lines 3 via an equilibrium pulse-like power. The display device 1 acquires pulse group data from the equilibrium pulse-like power, and executes the designated commend, thus displaying the number of products on the display portion 11.

A product handler working by the product display shelves confirms if the number displayed on the display device 1 is the same as the actual number of products displayed on a respective shelf. When these numbers match, the lamp switch 12 is pressed as a confirmation input. On the other hand, if the numbers of products do not match, the button switch. 13 is pressed to report so. In accordance with the switching operation, the display device 1 notifies the confirmed result of the number of sales products to the monitor control device 2 via the data and electric transmission/reception communication. The monitor control device 2 notifies the confirmation result sent from each display device 1 to the manager via the controller CON.

Further, it is also possible to notify from the manager to the product handler "the number of products that should be taken from the display shelf". In this case, if the product handler can take the designated number of products from the shelf, the lamp switch 12 should be pressed, whereas if there are not sufficient number of products, the button switch 13 should be pressed. In this manner, it can be confirmed if products have been taken as desired appropriately.

Furthermore, since the display device 1 can be easily mounted or detached, it is possible to instruct from the manager to the product handler "removal of the display device 1 from the product display shelf which is no longer in use". In this case, the product handler operates the lamp switch 12 or the button switch 13 in order to send the confirmation back to the manager before the display is actually taken away, or to notify the manager that it cannot be taken away for the reason that there are some products left on the shelf.

As described above, according to the two-wire type remote control system of the above-described embodiment, the transmission/reception of electrical power, and mutual transmission of data can be conducted only with the data and electrical transmission/reception communication lines 3 consisting of two power lines, and therefore the wiring operation can be simplified.

Further, a particular display device 1 can be specified by assigning its address from the monitor control device 2, and an instruction can be addressed a particular display device 1. Therefore, the number of display devices 1 can be easily increased. Moreover, the transmission of electricity and data communication are conducted via equilibrium pulse-like power, and therefore the loss of power can be prevented, and the generation of noise can be suppressed. In addition, there is no need to provide a circuit exclusively used for demodulation, and therefore the communication speed is significantly increased as compared to the conventional technique.

The units 15, 16 and 17 of the display device 1 can be set in an operable state simply by mounting the display device 1 on the wiring case 30, and the display device 1 can be detached simply applying a force in a predetermined direction. Therefore, it becomes possible to realize a system of an excellent operability.

In this manner, according to the embodiment, it is possible to establish a remarkable network system of wide usage, capable of remote control of all devices which uses power and interactive digital communications, at low cost.

As is clear from the description provided above, according to the present invention, there is provided a two-wire type remote control system which can accurately judge the polarity of data on a receiver side. Further, there is also realized a two-wire type remote control system of a general usage of a wide variety, having so various functions and yet suppressed power consumption.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

What is claimed is:

1. A two-wire remote control system comprising:

a wiring case including two power lines;

a control device comprising:

a generator for generating pulse group data representing an assigned address of a target device to be controlled and control data addressed to the target device; and a power controller for converting DC power into power in equilibrium pulse waveform according to the generated pulse group data, and supplying the converted power to the two power lines; and at least one device to be controlled which is removably attached to the wiring case such that the control device and the at least one to-be-controlled device are electrically connected to each other via the two power lines, comprising:

a charger for rectifying the converted power received from the two power lines, to be charged therein;

a polarity identifying circuit for detecting continuation of a logical level of the pulse group data included in the received power for a certain period of time, and identifying a polarity of the pulse group data;

a data processor for determining whether or not the assigned address of the self device is included in the received power according to the identified polarity, extracting control data from the pulse group data when the assigned address of the self device is included in the received power, and executing data processing according to the extracted control data;

a display for displaying a result of the data processing by the data processor;

a data generator for generating another pulse group data representing the assigned address of the self device and response data to the control device; and a power controller for converting the power stored by the charger into power in equilibrium pulse waveform according to the another pulse group data, and supplying the converted power to the two power lines.

2. A two-wire remote control system according to claim 1, wherein the control device further comprises a data processor for, when the power supply to the at least one to-be-controlled device is stopped by the power controller of the control device, receiving the power from the at least one to-be-controlled device via the two power lines, and decoding the another pulse group data included in the received power.

3. A two-wire remote control system according to claim 1, wherein the at least one to-be-controlled device further comprises a non-volatile memory which is readable by the data processor of the at least one to-be-controlled device, and the data processor of the at least one to-be-controlled device executes the data processing such that data writing or data reading into/from the non-volatile memory is selectively executed according to a request from the control device.

4. A two-wire display device which is removably attached to a wiring case including two power lines, and electrically connected to a control device via the two power lines in the wiring case, the control device converting DC power into power in equilibrium pulse waveform according to pulse group data representing an assigned address of a target destination and control data to the target destination, and supplying the converted power to the two power lines, the two-wire display device comprising:

a charger for rectifying the converted power received from the two power lines, to be charged therein;

a polarity identifying circuit for detecting continuation of a logical level of the pulse group data included in the received power for a certain period of time, and identifying a polarity of the pulse group data;

a data processor for determining whether or not the assigned address of the self device is included in the received power according to the identified polarity, extracting control data from the pulse group data when the assigned address of the self device is included in the received power, and executing data processing according to the extracted control data;

a display for visualizing a result of the data processing by the data processor;

a receiver for receiving a data input from an external device;

a data generator for generating another pulse group data representing the assigned address of the self device and response data to the control device, the response data including the data input received by the receiver; and a power controller for converting the power stored by the charger into power in equilibrium pulse waveform according to the another pulse group data, and supplying the converted power to the two power lines.

5. A display device according to claim 4, wherein the display is designed to indicate a letter, a symbol, and/or a numeral by way of a combination of a plurality of display segments thereof, and the display device further comprises a display test circuit for carrying out a display test by turning on the segments one by one consecutively.

6. A display device according to claim 4, wherein the display has a switch for revising a content of display, and the switch is designed to change a display function usually assigned to another display function by means of a software operation.

7. A display device according to claim 4, further comprising: a switch for outputting a pulse signal representing one of binary values when the switch is pressed down and a pulse signal representing the other of the binary values when a pressed-down state of the switch is released; and a switch data generator for, when an output value from the switch is changed, generating switch data representing such a change, wherein the switch data is reflected in contents of the response data.

8. A display device according to claim 4, further comprising a pair of wiring members which are connected to the two power lines, respectively upon being attached to the wiring case, wherein a contact point of each of the wiring members is brought into elastic contact with respective one of the power lines.

9. A display device according to claim 4, further comprising an elastic engagement mechanism for engaging itself to the wiring case by applying a force onto the body of the device in a first direction, and removing it from the wiring case by applying a force thereto in a second direction which is different from the first direction.

* * * * *